United States Patent
Guyette et al.

(10) Patent No.: US 10,044,399 B1
(45) Date of Patent: *Aug. 7, 2018

(54) COMMUNICATIONS RECEIVER USING MULTI-BAND TRANSMIT BLOCKING FILTERS

(71) Applicant: Resonant Inc., Santa Barbara, CA (US)

(72) Inventors: Andy Guyette, San Mateo, CA (US); Chris Levesque, Fountain Valley, CA (US)

(73) Assignee: Resonant Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,115

(22) Filed: Feb. 15, 2018

Related U.S. Application Data

(63) Continuation of application No. 15/717,577, filed on Sep. 27, 2017, now Pat. No. 9,929,769.

(60) Provisional application No. 62/448,781, filed on Jan. 20, 2017, provisional application No. 62/455,040, filed on Feb. 6, 2017.

(51) Int. Cl.
   *H04B 1/401* (2015.01)
   *H04W 72/04* (2009.01)
   *H04W 88/06* (2009.01)

(52) U.S. Cl.
   CPC ........ *H04B 1/401* (2013.01); *H04W 72/0453* (2013.01); *H04W 88/06* (2013.01)

(58) Field of Classification Search
   CPC ... H04B 1/401; H04B 1/525; H04W 72/0453; H04W 88/06
   See application file for complete search history.

(56) References Cited

U.S. PATENT DOCUMENTS

| | | | | |
|---|---|---|---|---|
| 8,736,399 | B2* | 5/2014 | Solski | H03H 7/463 333/126 |
| 2012/0249263 | A1* | 10/2012 | Zhang | H04B 1/0057 333/132 |
| 2014/0266510 | A1* | 9/2014 | Silver | H03H 9/465 333/186 |
| 2014/0266511 | A1* | 9/2014 | Turner | G06F 17/505 333/193 |
| 2015/0341076 | A1* | 11/2015 | Uejima | H04B 1/0057 455/78 |
| 2016/0126929 | A1* | 5/2016 | Leipold | H01F 17/0006 333/132 |
| 2016/0294031 | A1* | 10/2016 | Cheng | H01P 1/2002 |
| 2017/0302252 | A1* | 10/2017 | Hey-Shipton | H03H 9/6409 |

* cited by examiner

*Primary Examiner* — Devan Sandiford
(74) *Attorney, Agent, or Firm* — SoCal IP Law Group LLP; John E. Gunther; Steven C. Sereboff

(57) ABSTRACT

Communications receivers and devices are disclosed. A communications receiver includes a low noise amplifier; a multi-band transmit blocking filter having a first port connected to an output of the low noise amplifier, and an RF analog-to-digital converter having an input connected to a second port of the multi-band transmit blocking filter. The multi-band transmit filter passes the receive frequencies of a group of two or more LTE bands, where a first receive frequency range of a first band in the group and a second receive frequency range of a second band in the group are disjoint and not subsets of a receive frequency range of a third band in the group, and attenuates the transmit frequencies of at least some bands in the group by at least twenty dB.

24 Claims, 19 Drawing Sheets

US 10,044,399 B1

COMMUNICATIONS RECEIVER USING MULTI-BAND TRANSMIT BLOCKING FILTERS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATIONS

This application is a continuation of application Ser. No. 15/717,577, filed Sep. 27, 2017, which claims priority from Provisional Patent Application 62/448,781, filed Jan. 20, 2017, and Provisional Patent Application 62/455,040, filed Feb. 6, 2017, all of which are incorporated herein by reference.

BACKGROUND

Field

This disclosure relates to radio frequency filters using surface acoustic wave (SAW) resonators, and specifically to communications equipment incorporating such filters.

Description of the Related Art

A radio frequency (RF) filter is a two-terminal device configured to pass some frequencies and to stop other frequencies, where "pass" means transmit with relatively low insertion loss and "stop" means block or substantially attenuate. The range of frequencies passed by a filter is referred to as the "passband" of the filter. The range of frequencies stopped by such a filter is referred to as the "stopband" of the filter. A typical RF filter has at least one passband and at least one stopband. Specific requirements on a passband or stopband depend on the specific application. For example, a "passband" may be defined as a frequency range where the insertion loss of a filter is less than a defined value such as one dB, two dB, or three dB. A "stopband" may be defined as a frequency range where the insertion loss of a filter is greater than a defined value such as twenty dB, twenty-five dB, forty dB, or greater depending on application. A "multiple-passband" filter is a filter that provides multiple noncontiguous passbands separated by stopbands. For example, a dual-passband filter has two disjoint frequency ranges with low insertion loss separated by a stopband having high insertion loss.

RF filters are used in communications systems where information is transmitted over wireless links. For example, RF filters may be found in the RF front-ends of base stations, mobile telephone and computing devices, satellite transceivers and ground stations, IoT (Internet of Things) devices, laptop computers and tablets, fixed point radio links, and other communications systems. RF filters are also used in radar and electronic and information warfare systems.

RF filters typically require many design trade-offs to achieve, for each specific application, the best compromise between such performance parameters as insertion loss, rejection, isolation, power handling, linearity, size and cost. Specific design and manufacturing methods and enhancements can benefit simultaneously one or several of these requirements.

Performance enhancements to the RF filters in a wireless system can have broad impact to system performance. Improvements in RF filters can be leveraged to provide system performance improvements such as larger cell size, longer battery life, higher data rates, greater network capacity, lower cost, enhanced security, higher reliability, etc. These improvements can be realized at many levels of the wireless system both separately and in combination, for example at the RF module, RF transceiver, mobile or fixed sub-system, or network levels.

Surface acoustic wave (SAW) resonators are used in a variety of RF filters including band-reject filters, band-pass filters, duplexers, and multiplexers. A duplexer is a radio frequency filter device that allows simultaneous transmission in a first frequency band and reception in a second frequency band (different from the first frequency band) using a common antenna. A multiplexer is a radio frequency filter with more than two input or output ports with multiple passbands. A triplexer is a four-port multiplexer with three passbands.

As shown in FIG. 1, a typical SAW resonator 100 is formed by thin film conductor patterns formed on a surface of a substrate 105 made of a piezoelectric material such as quartz, lithium niobate, lithium tantalate, or lanthanum gallium silicate. The substrate 105 is commonly a single-crystal slab of the piezoelectric material, or a composite substrate including a thin single-crystal wafer of the piezoelectric material bonded to another material such as silicon, sapphire, or quartz. A composite substrate is commonly used to provide a thermal expansion coefficient different from the thermal expansion coefficient of the single-crystal piezoelectric material alone. A first inter-digital transducer (IDT) 110 includes a plurality of parallel conductors. A radio frequency or microwave signal applied to the first IDT 110 via an input terminal IN generates an acoustic wave on the surface of the substrate 105. As shown in FIG. 1, the surface acoustic wave will propagate in the left-right direction. A second IDT 120 converts the acoustic wave back into a radio frequency or microwave signal at an output terminal OUT. The conductors of the second IDT 120 are interleaved with the conductors of the first IDT 110 as shown. In other typical SAW resonator configurations (not shown), the conductors forming the second IDT are disposed on the surface of the substrate 105 adjacent to, or separated from, the conductors forming the first IDT. Also, extra fingers (commonly called "dummy" fingers) are sometimes formed opposite to the ends of the IDT fingers and connected to the IN and OUT bus bars of the first and second IDTs 110 and 120. Grating reflectors 130, 135 are disposed on the substrate to confine most of the energy of the acoustic waves to the area of the substrate occupied by the first and second IDTs 110, 120. The grating reflectors 130, 135 float or are connected to either the IN terminal or the OUT terminal. In general, the SAW resonator 100 is bi-directional, and the IN and OUT terminal designations may be transposed.

The electro-acoustic coupling between the first IDT 110 and the second IDT 120 is highly frequency-dependent. The basic behavior of acoustic resonators (SAW, bulk acoustic wave, film bulk acoustic wave, etc.) is commonly described using the Butterworth Van Dyke (BVD) circuit model as shown in FIG. 2A. The BVD circuit model consists of a motional arm and a static arm. The motional arm includes a motional inductance $L_m$, a motional capacitance $C_m$, and a resistance $R_m$. The static arm includes a static capacitance $C_0$ and a resistance $R_0$. While the BVD model does not fully describe the behavior of an acoustic resonator, it does a good job of modeling the two primary resonances that are used to design band-pass filters, duplexers, and multiplexers (multiplexers are filters with more than 2 input or output ports with multiple passbands).

The first primary resonance of the BVD model is the motional resonance caused by the series combination of the motional inductance $L_m$ and the motional capacitance $C_m$. The second primary resonance of the BVD model is the anti-resonance caused by the combination of the motional inductance $L_m$, the motional capacitance $C_m$, and the static capacitance $C_0$. In a lossless resonator ($R_m=R_0=0$), the frequency $F_r$ of the motional resonance is given by $$F_r = \frac{1}{2\pi\sqrt{L_m C_m}} \quad (1)$$

The frequency $F_a$ of the anti-resonance is given by $$F_a = F_r\sqrt{1+\frac{1}{\gamma}} \quad (2)$$

where $\gamma=C_0/C_m$ is a characteristic of the substrate upon which the SAW resonator is fabricated. $\gamma$ is dependent on both the material and the orientation of the crystalline axes of the substrate, as well as the physical design of the IDTs.

The frequencies of the motional resonance and the anti-resonance are determined primarily by the pitch and orientation of the interdigitated conductors, the choice of substrate material, and the crystallographic orientation of the substrate material.

FIG. 2B is a plot of the admittance of a theoretical lossless acoustic resonator. The admittance exhibits a motional resonance 212 where the admittance of the resonator approaches infinity, and an anti-resonance 214 where the admittance of the resonator approaches zero. In over-simplified terms, the lossless acoustic resonator can be considered a short circuit at the frequency of the motional resonance 212 and an open circuit at the frequency of the anti-resonance 214. The frequencies of the motional resonance 212 and the anti-resonance 214 are representative, and a resonator may be designed for other frequencies.

Cellular telephones operate in various bands defined by industry or governmental standards. For example, the 3GPP LTE (Third Generation Partnership Project Long Term Evolution) standard (ETSA TS 136 101 V13.3.0) defines 50 different bands over a frequency range of about 450 MHz to greater than 5000 MHz. These are referred to herein as "LTE bands". Each of the LTE bands consists of a frequency range or a pair of disjoint frequency ranges used for cellular telephone communications. For example, LTE band 12, which is used in the United States and Canada, employs the frequency range from 699 MHz to 716 MHz for communications from the cellular device to the cellular network and the frequency range from 729 MHz to 746 MHz for communications from the network to the device. LTE band 40, used in several countries in Asia, employs the frequency range from 2300 MHz to 2400 MHz for communications in both directions. A few LTE bands, such as LTE band 67, are defined for downlink use only, which is to say the band defines a frequency range where a user device may receive, but not transmit. Some LTE bands overlap, or are superimposed on other LTE bands. For example, LTE bands 4 and 10 are subsets of LTE band 66.

All of bands defined by the 3GPP LTE standard are not currently in use, and only one or a few bands are typically used in any particular country. Further, different cellular service providers in any given country may each have frequency allocations within one or multiple bands. To allow international roaming, it is desirable for cellular phones to be capable of operation in as many frequency bands as possible.

Carrier aggregation is a technique to increase data rates by transmitting multiple signals or carriers to a cellular phone. The multiple signals may be within the same band or in multiple bands in situations where the service provider has frequency allocations in multiple bands. To facilitate carrier aggregation, it is desirable for cellular phones to be capable of simultaneous operation in multiple frequency bands.

Throughout this description, elements appearing in figures are assigned three-digit reference designators, where the most significant digit is the figure number where the element is first shown and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
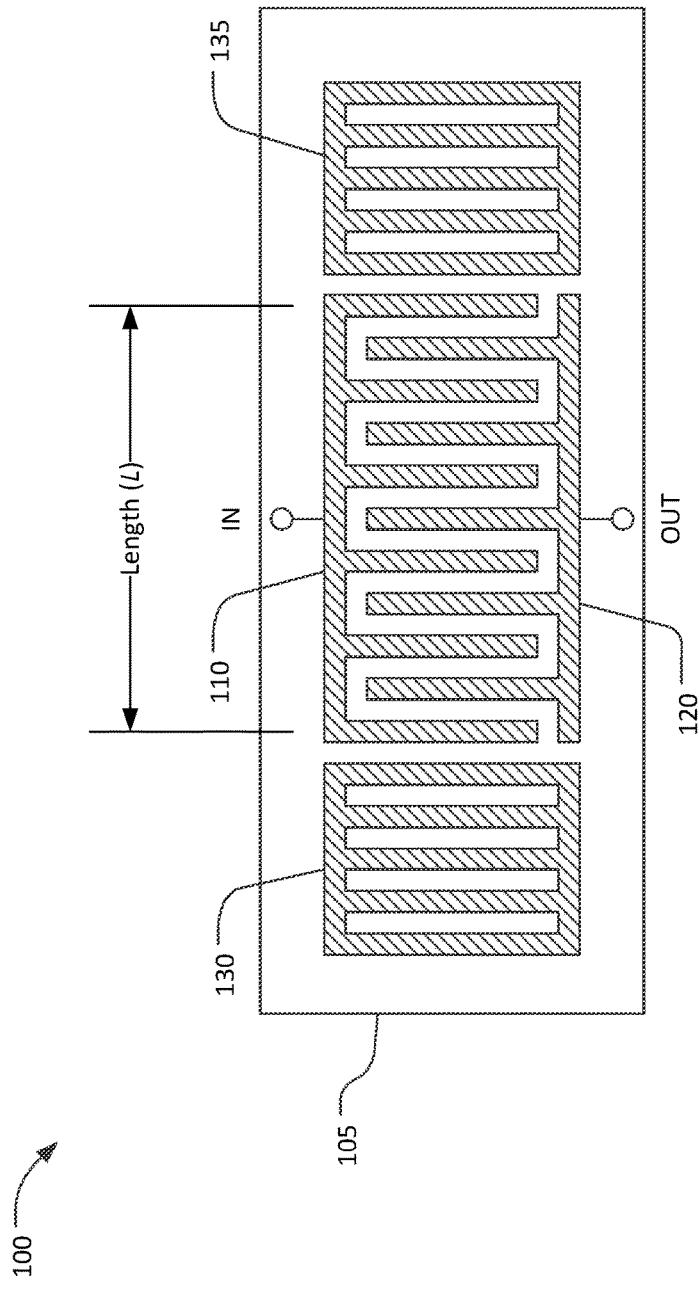
FIG. 1 is a simplified schematic plan view of a SAW resonator.
Figure 2B:
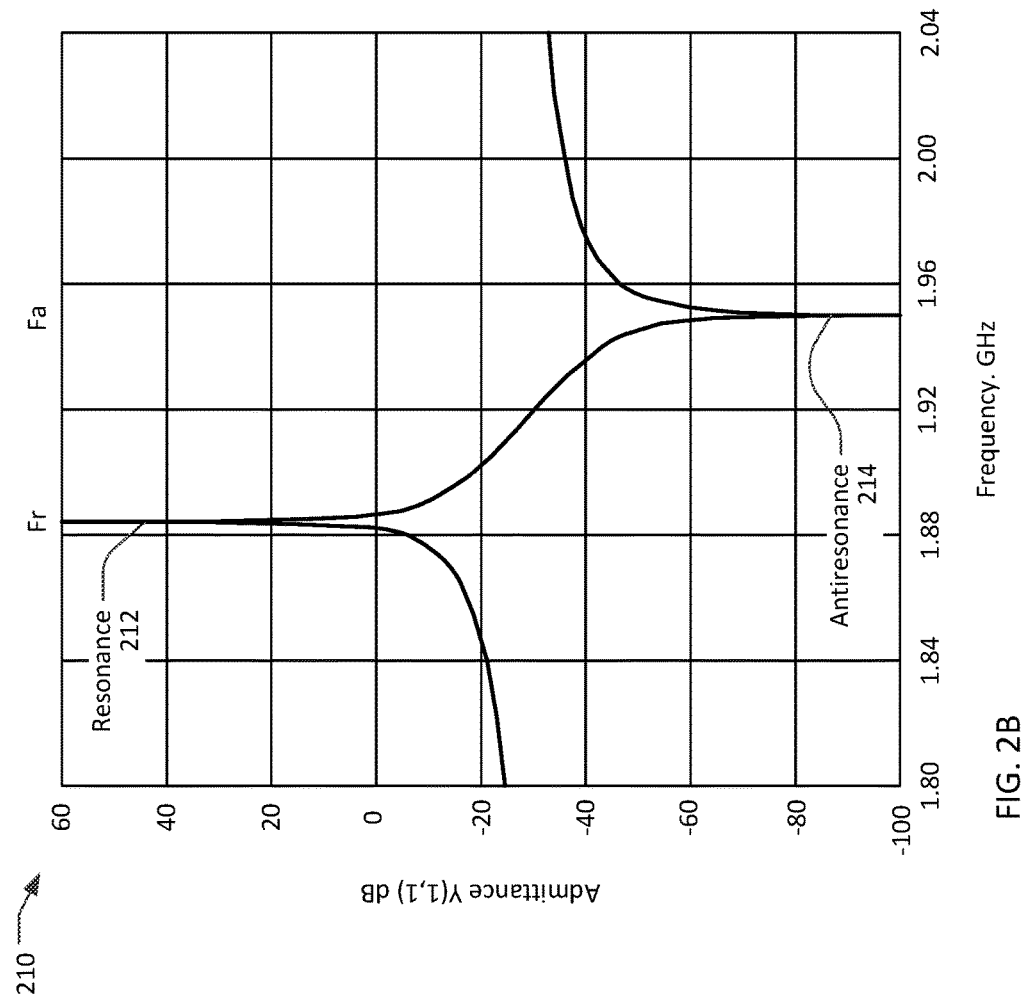
FIG. 2B is graph of the admittance of a lossless SAW resonator.
Figure 2A:
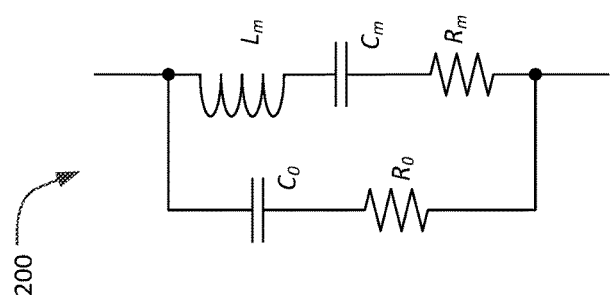
FIG. 2A is an equivalent circuit of a SAW resonator.
Figure 3:
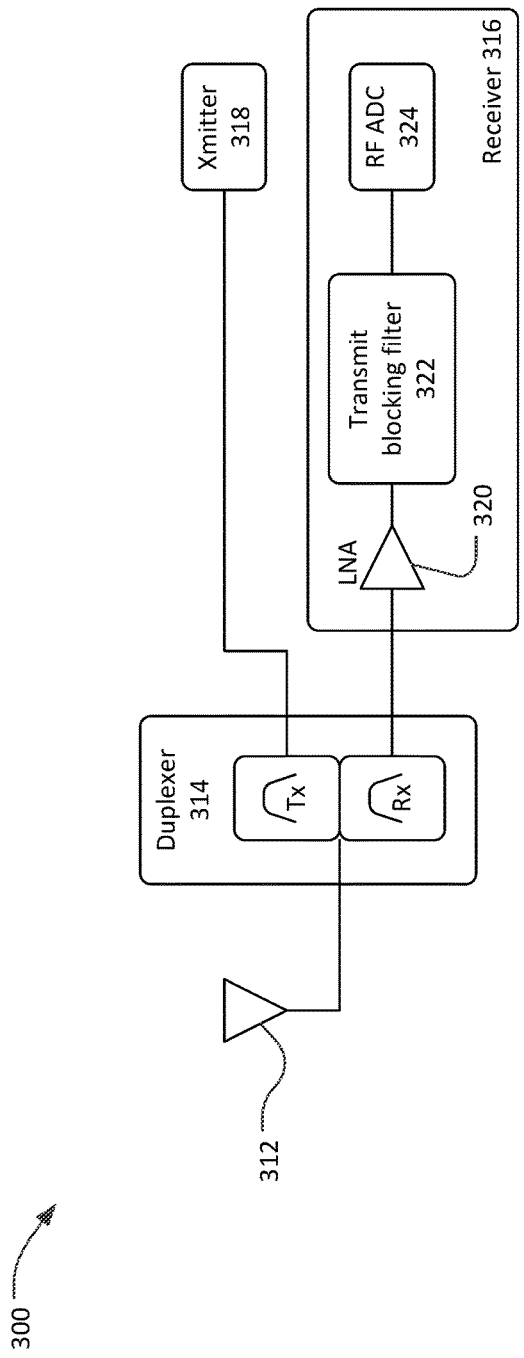
FIG. 3 is a block diagram of a radio frequency (RF) system for a communications device.

FIG. 3 is a block diagram of a radio 300 for use in a communications device. The radio 300 may be configured for communicating in one of the LTE bands. The radio 300 includes an antenna 312, a duplexer 314, a receiver 316, and a transmitter 318. The duplexer 314 includes a receive port for connection to the receiver 316, a transmit port for connection to the transmitter 318, and an antenna port for connection to the antenna 312. Within the duplexer 314, a receive filter is coupled between the receive port and the antenna port, and a transmit filter is coupled between the antenna port and the transmit port. The receive filter is configured to pass the receive frequency range and block the transmit frequency range of the associated LTE band. The transmit filter is configured to pass the transmit frequency range and block the receive frequency range, such that sidebands of the transmit signal that fall within the receive frequency range are attenuated. The terms "receive frequency range" and "transmit frequency range" are from the perspective of a user device. The receive frequency range and the transmit frequency range are equivalent to the downlink frequency range and uplink frequency range as defined in the LTE specification.

The receiver 316 includes a low noise amplifier 320 (LNA), a transmit blocking filter 322, and an RF analog to digital converter ADC 324. The input of the LNA 320 is connected to the receive port of the duplexer 314. The duplexer 314 typically provides high isolation between its transmit port and its receive port. Nevertheless, the small component of the transmit signal that leaks through the duplexer 314 may be comparable to or larger than the received power at the input to the LNA 320. To prevent the transmit signal from obscuring the received signal at the input to the RF ADC, the transmit blocking filter 322 is provided between the output of the LNA 320 and the input of the RF ADC 324. The transmit blocking filter 322, which may also be called an "ADC protect filter," is configured to pass the receive frequency range while stopping, or substantially attenuating, the transmit frequency range. The digital output from the RF ADC 324 is provided to a processor (not shown) that demodulates and extracts data from the received signal.

Figure 4:
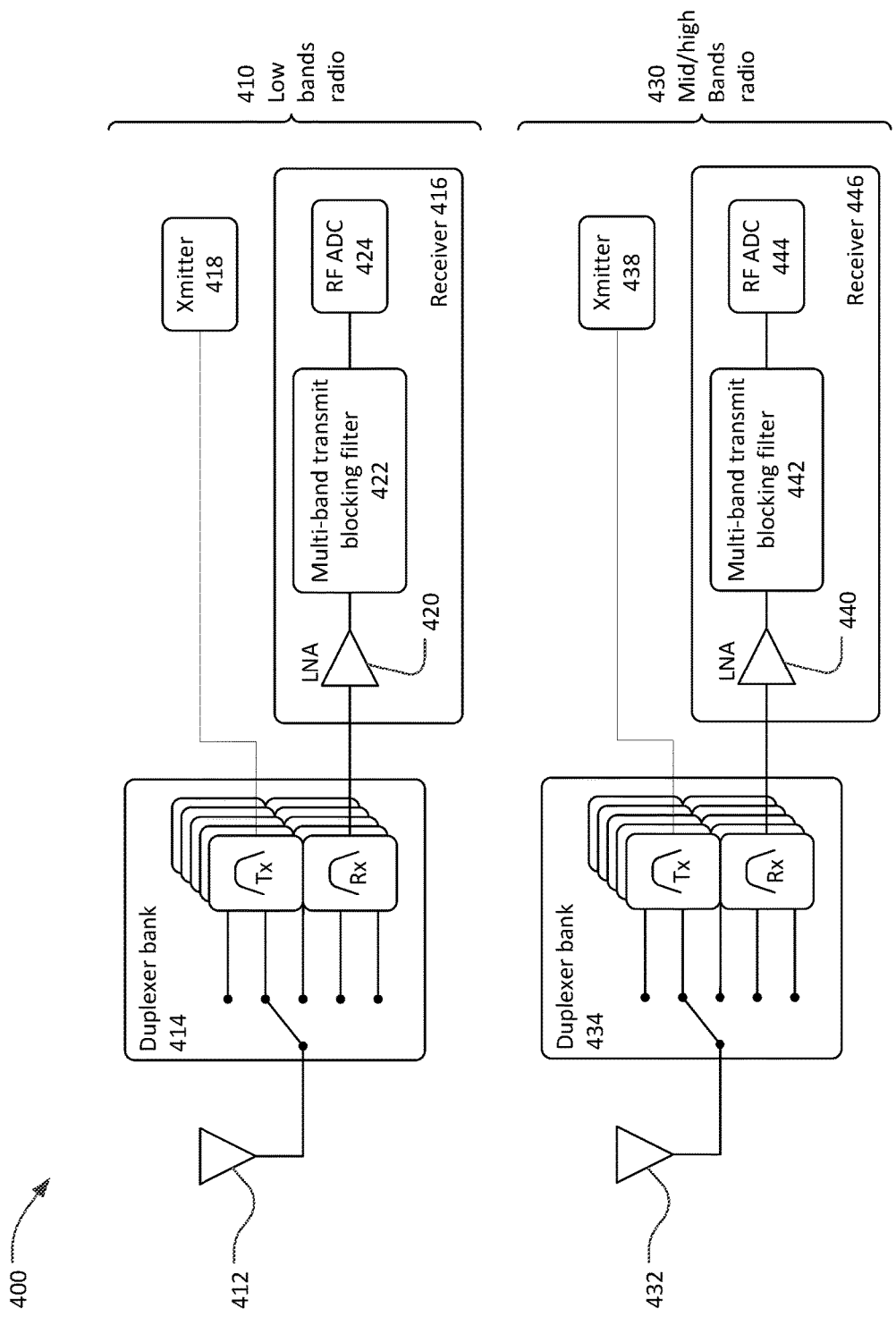
FIG. 4 is a block diagram of another radio frequency (RF) system for a communications device.

FIG. 4 is a block diagram of an RF subsystem 400 for a communications device. The RF subsystem 400 includes a low bands radio 410 and a mid/high bands radio 430. The low bands radio 410 may be configured for communicating in one or more LTE bands within a frequency range of about 700 MHz to 1 GHz. The mid/high bands radio 430 may be configured for communicating in one or more LTE bands within a frequency range of about 1.7 GHz to 2.7 GHz.

The low bands radio 410 includes a low bands antenna 412, a duplexer bank 414, a receiver 416, and a transmitter 418. The duplexer bank 414 includes a plurality of duplexers for specific LTE bands. Each duplexer includes a receive port for connection to the receiver 416, a transmit port for connection to the transmitter 418, and an antenna port for connection to the antenna 412. Within each duplexer, a receive filter is coupled between the receive port and the antenna port, and a transmit filter is coupled between the antenna port and the transmit port. Each receive filter is configured to pass the receive frequency range of the associated LTE band and each transmit filter is configured to pass the transmit frequency range of the associated LTE band. The duplexer band also includes radio frequency (RF) switches to connect one or more of the duplexers to the antenna, receiver, and transmitter depending on what LTE band or bands are used for communications.

The receiver 416 includes one or more low noise amplifier 420 (LNA), a multi-band transmit blocking filter 422, and an RF analog to digital converter ADC 424. The input of the LNA 420 is connected to the receive ports of one or more duplexers in the duplexer bank 414. While a single LNA 420 is shown, the receiver 416 may include a bank of LNAs corresponding to the bank of duplexers. In this case, the input of each LNA may be connected to the receive port of the corresponding duplexer. The multi-band transmit blocking filter 422 is coupled between the output of the LNA 420 and the input the RF ADC 424. The digital output from the RF ADC 424 is provided to a processor (not shown) that demodulates and extracts data from the received signal. The multi-band transmit blocking filter 422 is configured to pass the receive frequencies of a group of two or more LTE bands, where a first receive frequency range of a first band in the group and a second receive frequency range of a second band in the group are disjoint (non-overlapping) and not subsets of a receive frequency range of a third band in the group. The multi-band transmit blocking filter 422 is also configured to stop, or substantially attenuate, the transmit frequencies of some or all of the bands in the group.

The mid/high bands radio 430 includes a mid/high bands antenna 432, a duplexer bank 434, a receiver 436, and a transmitter 438. The receiver 436 includes one or more low noise amplifier 440 (LNA), a multi-band transmit blocking filter 442, and an RF analog to digital converter ADC 444. Except for frequency range of operation, each of the elements of the mid/high bands receiver 430 functions analogously to the corresponding elements of the low bands receiver 410.

Figure 5:
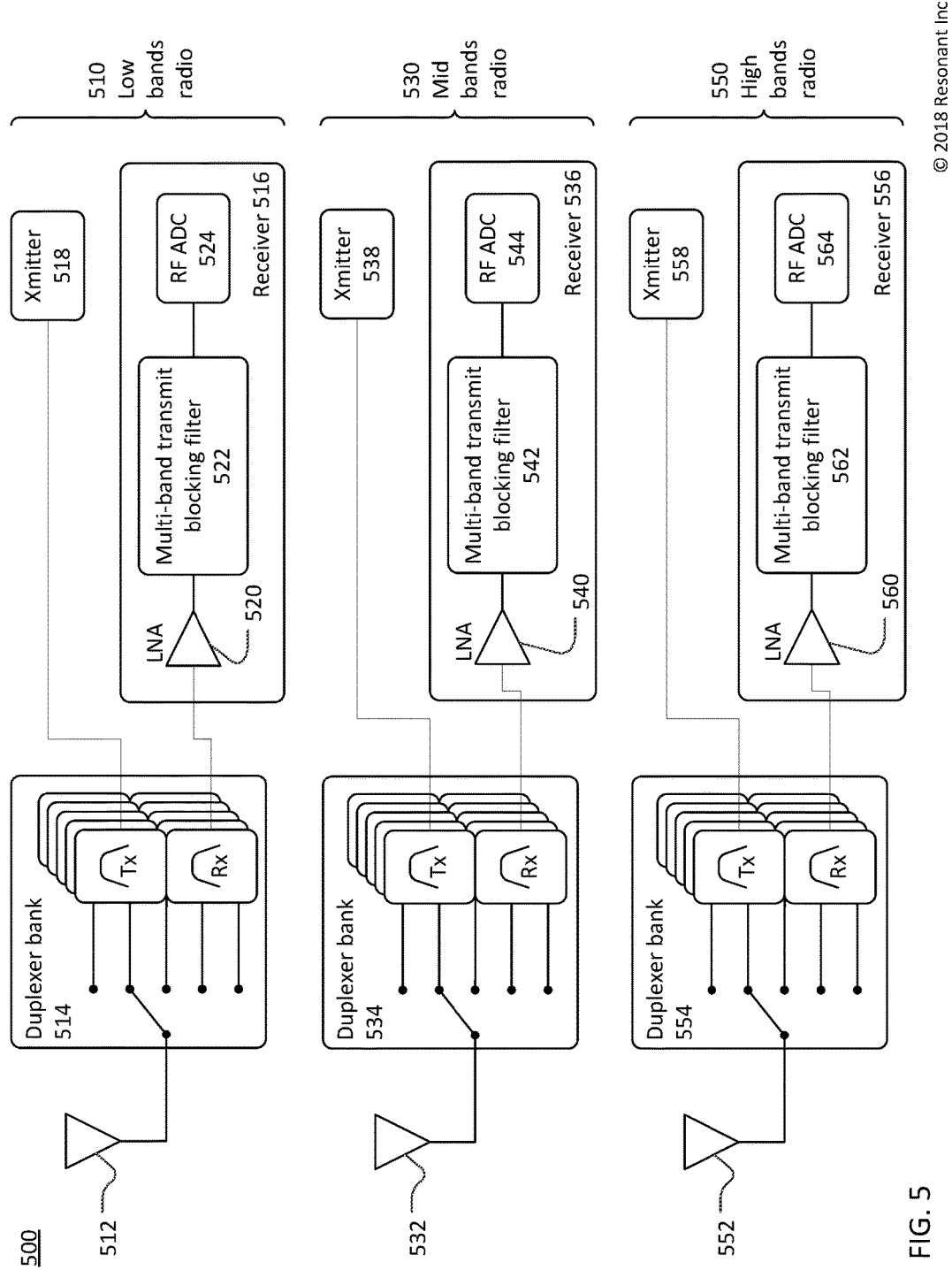
FIG. 5 is a block diagram of another radio frequency (RF) system for a communications device.

FIG. 5 is a block diagram of another RF subsystem 500 for a communications device. The RF subsystem 500 includes a low bands radio 510 (which may be the same as the low bands radio 410 in the RF subsystem 400), a mid bands radio 530, and a high bands radio 550. The low bands radio 510 may be configured for communicating in one or more LTE bands within a frequency range of about 700 MHz to 1 GHz. The mid bands radio 530 may be configured for communicating in one or more LTE bands within a frequency range of about 1.7 GHz to 2.2 GHz. The high bands radio 550 may be configured for communicating in one or more LTE bands within a frequency range of about 2.3 GHz to 2.7 GHz. The high bands radio 550 may also be configured to operate in the 2.4 GHz industrial, scientific, and medical (ISM) band which may include Wi-Fi® and Bluetooth®.

Each of the low bands radio 510, the mid bands radio 530, and the high bands radio 550 includes a respective antenna 512/532/552, a duplexer bank 514/534/554, a receiver 516/536/556, and a transmitter 518/538/558. Each receiver includes one or more low noise amplifier 520/540/560), a multi-band transmit blocking filter 522/542/562, and an RF analog to digital converter 524/544/564. Except for frequency range of operation, each of these elements functions analogously to the corresponding elements of the low bands receiver 410 in the RF subsystem 400 of FIG. 4.

Figure 6:
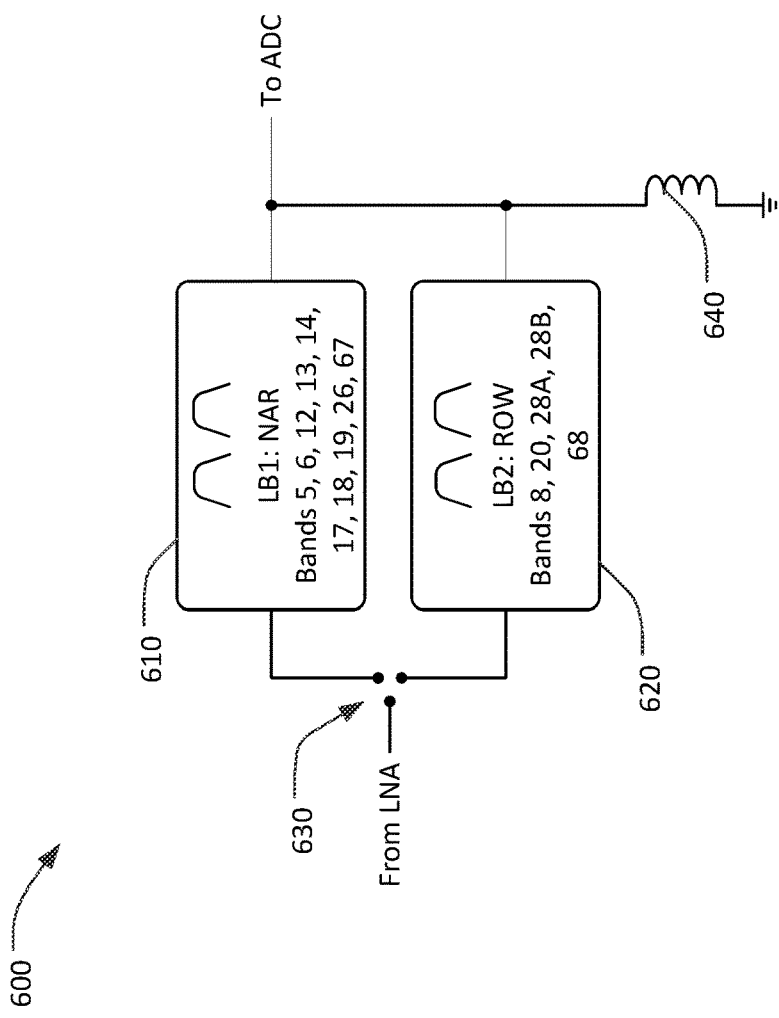
FIG. 6 is a block diagram of a low bands multi-band transmit blocking filter.

FIG. 6 is block diagram of a low bands multi-band transmit blocking filter suitable for use at 422 in the RF subsystem 400 or at 522 in the RF subsystem 500. It is not possible for a single filter to pass the receive frequencies and stop the transmit frequencies of all low frequency LTE bands, simply because the transmit frequencies of some bands overlap the receive frequencies of other bands. Thus the multi-band transmit blocking filter 600 may include one or both of a first dual-passband filter 610 and second dual-passband filter 620.

The first dual-passband filter 610 may pass receive frequencies and stop transmit frequencies of LTE bands commonly used in North America and adjacent regions (NAR). For example, the first dual-passband filter 610 may pass receive frequencies and stop transmit frequencies of some or all of LTE bands 5, 6, 12-14, 17-19, 26, and 67. This combination of bands allows carrier aggregation using pairs of bands including, for example, bands 5 and 12, bands 5 and 13, and bands 5 and 17. Example 1, to be discussed subsequently, is a dual-passband SAW filter suitable for use at 610.

The second dual-passband filter 620 may pass receive frequencies and stop transmit frequencies of LTE bands commonly used in the rest of the world (ROW) other than North America and adjacent regions. For example, the second dual-passband filter 620 may pass receive frequencies and stop transmit frequencies of some or all of LTE bands 8, 20, 28A, 28B, and 68. This combination of bands allows carrier aggregation using pairs of bands including, for example, bands 8 and 20, and bands 8 and 28. Example 2, to be discussed subsequently, is a dual-passband SAW filter suitable for use at 620.

When both dual-passband filters 610, 620 are installed in the low bands radio of a communications device, one of the dual-passband filters 610, 620 may be selected for use (depending on the location of the communications device) by an RF switch 630. Alternatively, only one of the dual-passband filters 610, 620 may be installed in the low bands radio. An inductor 640 may be used to match the output impedance of the dual-passband filters 610, 620 to the input impedance of the RF ADC such as the RF ADC 424 or 524.

Figure 7:
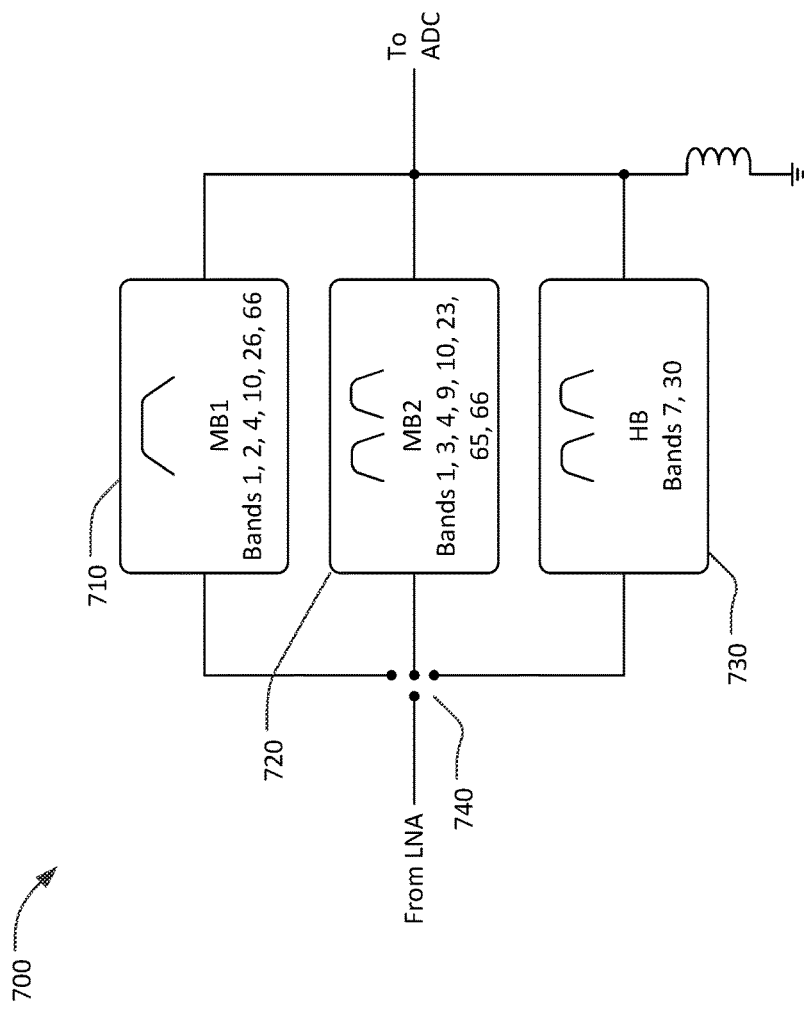
FIG. 7 is a block diagram of a mid/high bands multi-band transmit blocking filter.

FIG. 7 is block diagram of a mid/high bands multi-band transmit blocking filter 700 suitable for use at 442 in the RF subsystem 400. The mid/high bands multi-band transmit blocking filter 700 may include one or more of a first mid-bands filter (MB1) 710, a second mid-bands filter (MB2) 720, and a high-bands filter 730. Without the high-bands filter 730, the multi-band transmit blocking filter 700 may be suitable for use at 542 in the RF subsystem 500.

The first mid-bands filter 710 may be a band-pass filter configured to pass receive frequencies and stop transmit frequencies of LTE bands 1, 2, 4, 10, 26, and 66. This combination of bands allows carrier aggregation using pairs of bands including, for example, bands 2 and 4, and bands 2 and 66. Example 3, to be discussed subsequently, is a SAW band-pass filter suitable for use at 710.

The second mid-bands filter 720 may be a dual-passband filter configured to pass receive frequencies and stop transmit frequencies of LTE bands 1, 3, 4, 9, 10, 23, 65, and 66. This combination of bands allows carrier aggregation using pairs of bands including, for example, bands 1 and 3. Example 4, to be discussed subsequently, is a SAW dual-passband filter suitable for use at 720.

The high-bands filter 730 may be a dual-passband filter configured to pass receive frequencies and stop transmit frequencies of LTE bands 7 and 30. This combination of bands allows carrier aggregation using bands 7 and 30. The combination of the high-bands filter and one of the mid-bands filters 710, 720 allows carrier aggregation using, for example, bands 1 and 7; bands 1, 3, and 7; bands 2 and 7; bands 2 and 30; bands 2, 4, and 7; bands 2, 4, and 30; and bands 2, 7, and 66. Example 5, to be discussed subsequently, is a SAW dual-passband filter suitable for use at 730.

Selection of one or more of the filters 710, 720, 730 for use may be accomplished using an RF switch at 740 or in some other manner as previously described.

Figure 8:
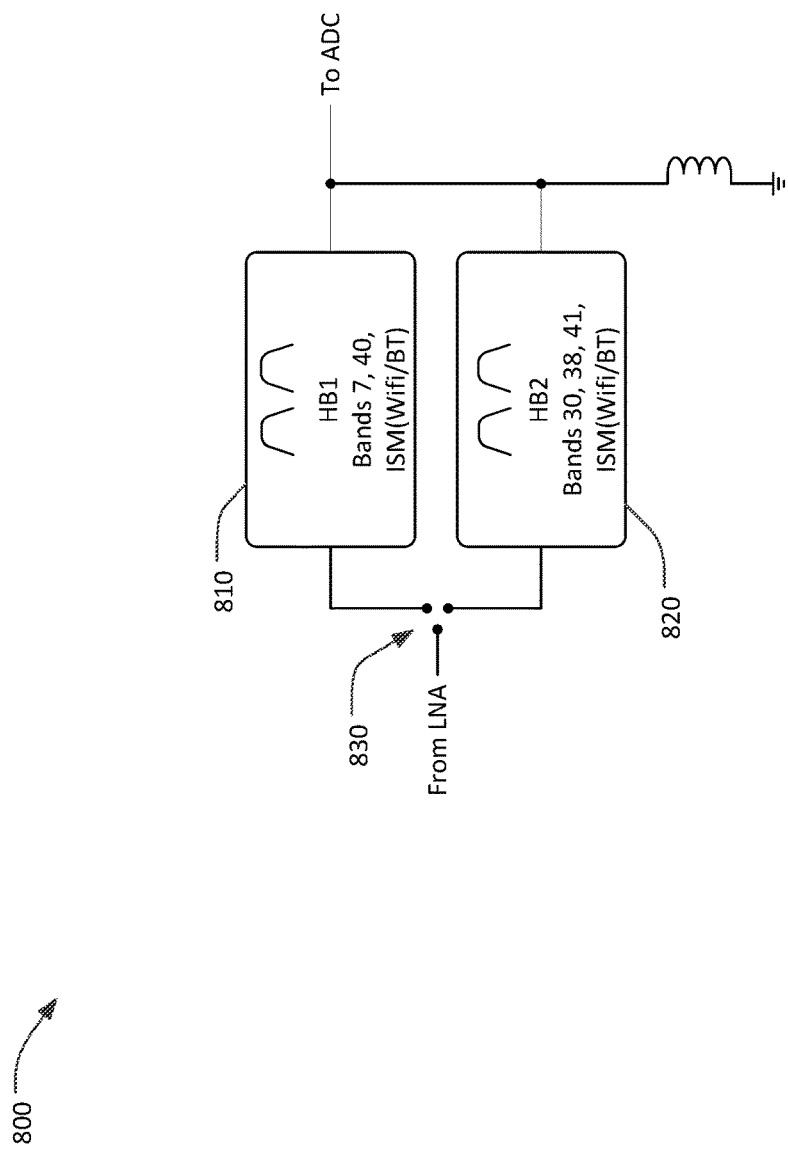
FIG. 8 is a block diagram of a high bands multi-band transmit blocking filter.

FIG. 8 is a block diagram of a high-bands multi-band transmit blocking filter 800 suitable for use at 522 in the RF subsystem 500. The multi-band transmit blocking filter 800 may include one or both of a first dual-passband filter 810 and second dual-passband filter 820.

The first dual-passband filter 810 may, for example, pass receive frequencies and stop transmit frequencies of LTE band 7. The first dual-passband filter 810 may also pass frequencies of LTE band 40 and the 2.4-2.5 GHz ISM band. Both LTE band 40 and the ISM band use time division duplexing where the same frequencies are used for receptions and transmission. The 2.4-2.5 GHz ISM band is used for various communications protocols including Bluetooth and Wi-Fi in accordance with IEEE 802.11(b), (g), and (n).

The second dual-passband filter 820 may, for example, pass receive frequencies and stop transmit frequencies of LTE band 30. The second dual-passband filter 820 may also pass frequencies of LTE band 38, LTE band 41, and the 2.4-2.5 GHz ISM band. These bands use time division duplexing where the same frequencies are used for receptions and transmission.

Selection of one of the filters 810, 820 for use may be accomplished using an RF switch at 830. Alternatively, only one of the filters 810, 820 may be installed in the communications device.

Figure 9:
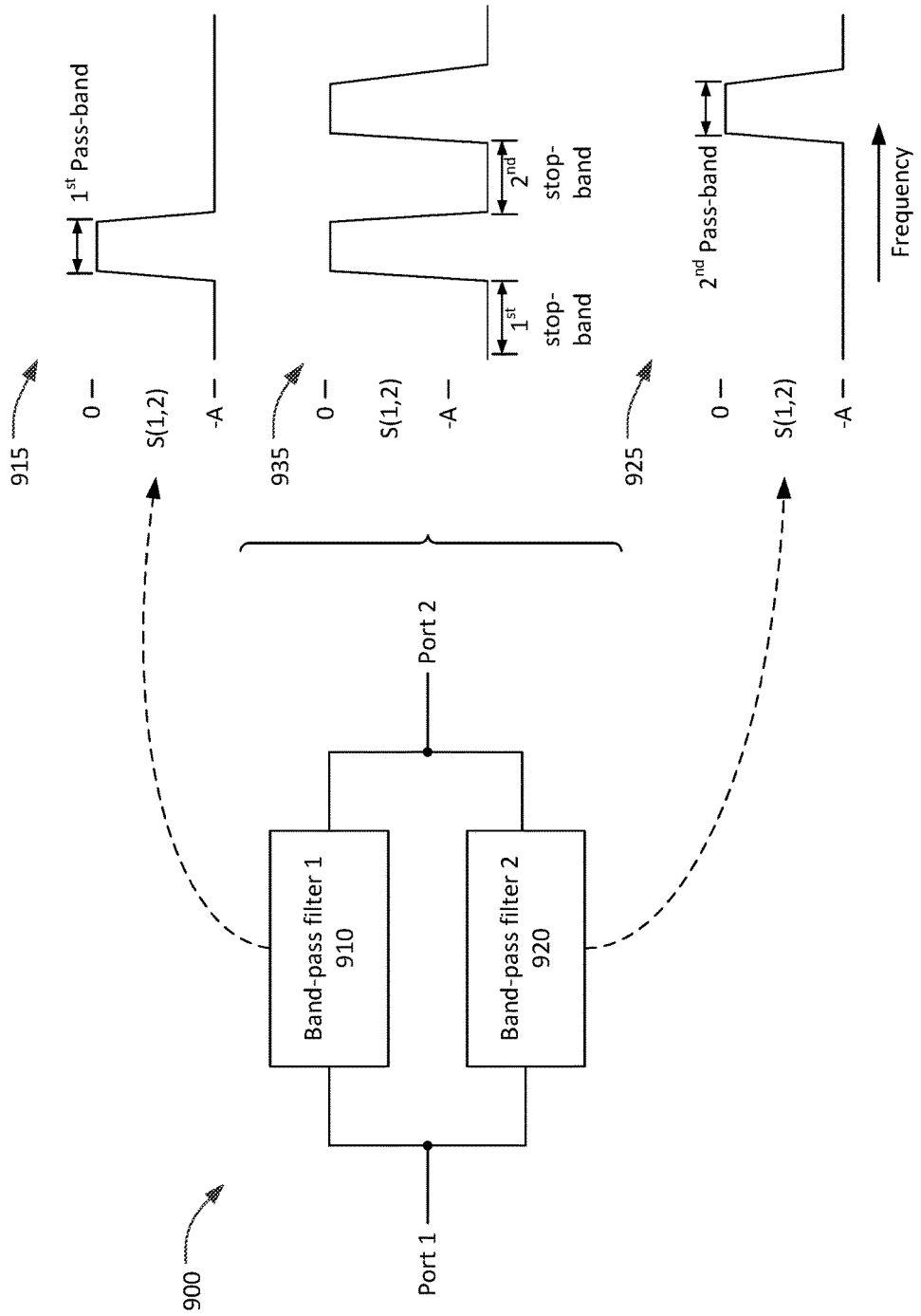
FIG. 9 is a block diagram of a surface acoustic wave dual-passband filter.

FIG. 9 is a block diagram of a dual-passband filter 900 suitable for use as a multi-band transmit blocking filter. The dual-passband filter 900 includes a first band-pass filter 910 in parallel with a second band-pass filter 920. Considered individually, the first band-pass filter 910 has low insertion loss for a first passband and higher insertion loss for frequencies outside of the first passband, as shown in the graph 915 of S(1,2) (the input-output transfer function) of the filter 910 as a function of frequency. Considered individually, the second band-pass filter 920 has low insertion loss for a second passband, higher in frequency than the first passband, and higher insertion loss for frequencies outside of the second passband, as shown in the graph 925 of S(1,2) (the input-output transfer function) of the filter 920 as a function of frequency.

The third chart 935 is a plot of S(1,2) for the dual-passband filter 900 formed by the first and second band-pass filters 910, 920 connected in parallel. The dual-passband filter 900 provides a first passband, a second passband higher in frequency than the first passband, a first stopband lower in frequency than the first passband, and a second stopband between the first and second passbands. The insertion loss of the dual-passband filter 900 is low for both the first passband and the second passband as defined by the respective band-pass filter 910, 920. By controlling the phase of the transmission of the two band-pass filters 910, 920 for frequencies within the stopband, the insertion loss of the dual-passband filter 900 in at least one of the first and second stopbands can be greater than the insertion loss of either constituent band-pass filter. Specifically, if the transmission through the two band-pass filters 910, 920 at a particular frequency has similar amplitude and a phase difference of about 180 degrees, the transmissions through the two filters will cancel to some extent, such that insertion loss of the two filters in parallel is greater than the insertion loss of either filter in isolation.

Example 1

Figure 10:
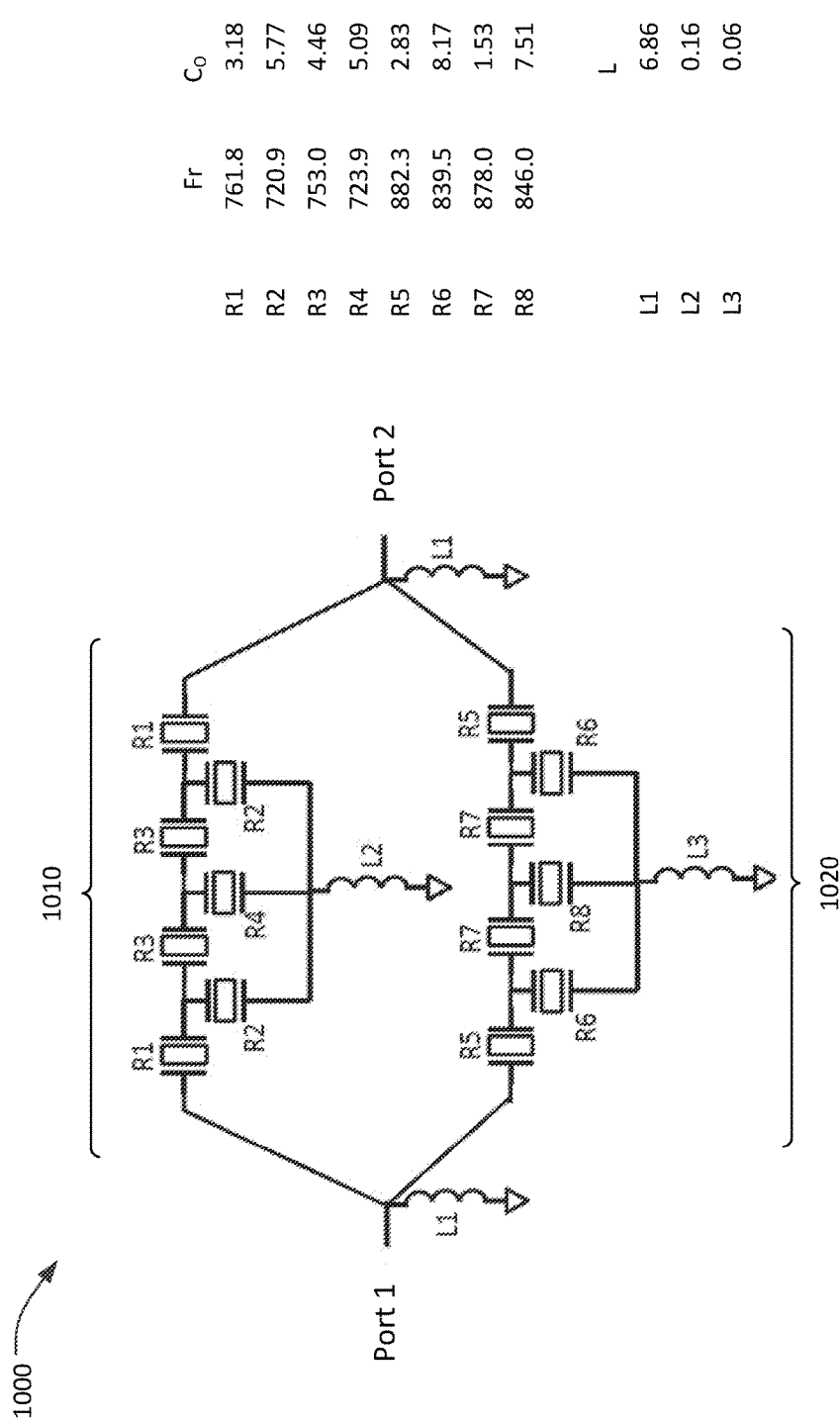
FIG. 10 is a schematic diagram of a first exemplary SAW dual-passband filter.

FIG. 10 is a schematic diagram of a dual-passband SAW filter 1000 suitable for use as the first low band filter 610. The dual-passband filter 1000 includes a first band pass filter 1010 and a second band-pass filter 1020 in parallel. The first band-pass filter 1010 is formed by series SAW resonators R1 and R3, shunt SAW resonators R2 and R4, and inductor L2. The second band-pass filter 1020 is formed by series SAW resonators R5 and R7, shunt SAW resonators R6 and R8, and inductor L3. Inductors L1 may be present to adjust the input and output impedance of the dual-passband filter. Values of these components are provided in the table within FIG. 10.

Figure 11:
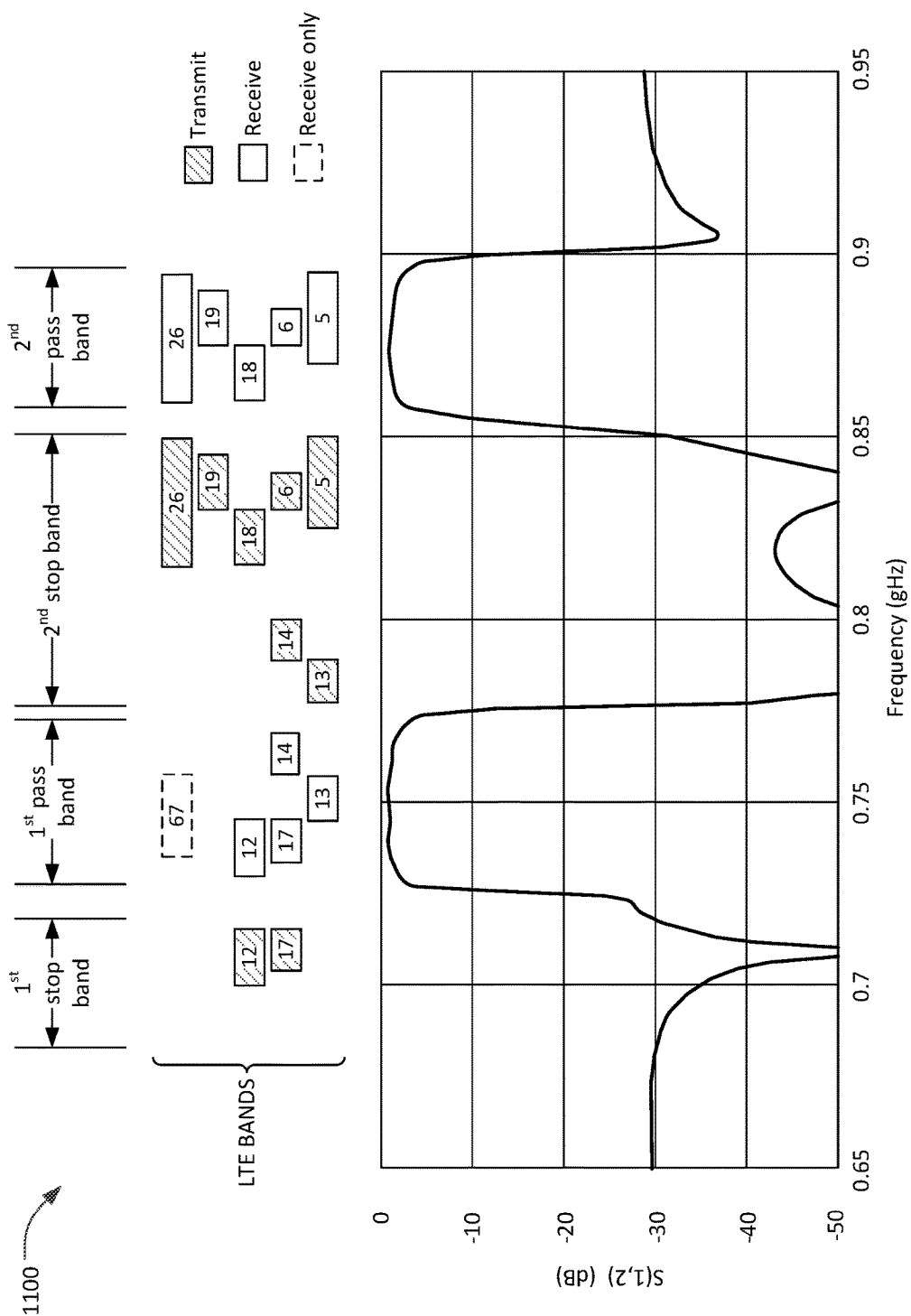
FIG. 11 is a chart showing S(2,1) of the first exemplary SAW dual-passband filter of FIG. 10.

FIG. 11 is a graph of the input-output transfer function S(1,2) versus frequency for the dual-passband filter 1000 of FIG. 10. The dual-passband filter 1000 provides a first passband, a second passband higher in frequency than the first passband, a first stopband lower in frequency than the first passband, and a second stopband between the first and second passbands. The receive frequencies (white bars) and transmit frequencies (shaded bars) of various LTE bands are shown above the graph on the same frequency axis. The first pass band includes the receive frequencies of LTE bands 12-14, 17, and 67. The second pass band includes the receive frequencies of LTE bands 5, 6, 18, 19, and 26. The dual-passband filter 100 stops (i.e. provides at least 30 dB attenuation) the transmit frequencies of the same bands (with the exception of band 67, is which is a receive-only band).

Note the first band-pass filter 1010 could be considered a multi-band filter in its own right since it passes the receive frequencies of a group of LTE bands (i.e. LTE band 12, 13, 14, 17, and 67 where the receive frequency ranges of LTE bands 12 and 14 are disjoint and not a subset of the receive frequency range of any other band in the group. The second band-pass filter 1020 is not a multi-band filter as previously defined since the receive frequencies of LTE bands 5, 6, 18, and 19 are all subsets of the receive frequency range of LTE band 26.

Example 2

Figure 12:
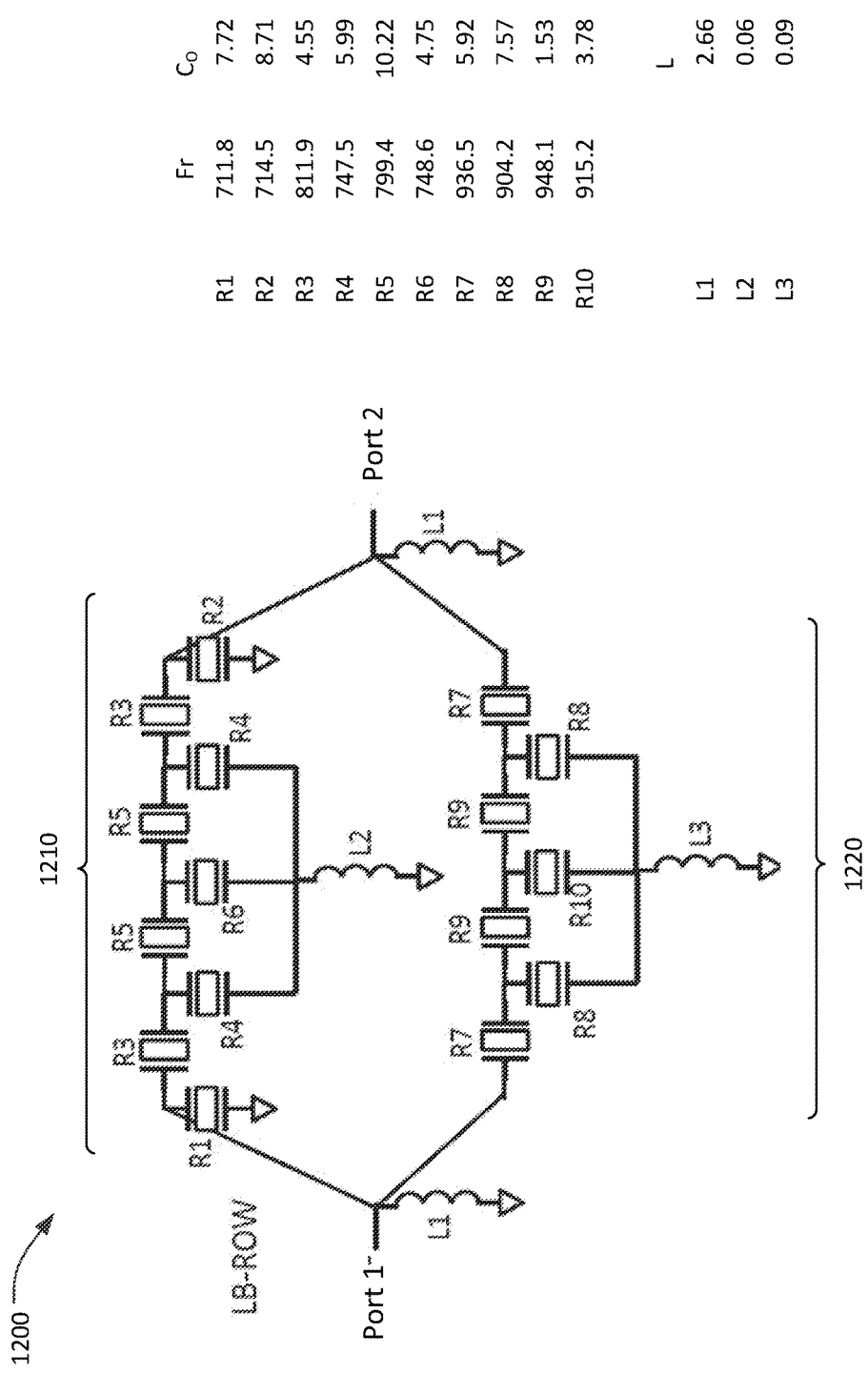
FIG. 12 is a schematic diagram of a second exemplary SAW dual-passband filter.

FIG. 12 is a schematic diagram of a dual-passband SAW filter 1200 suitable for use as the second low band filter 620. The dual-passband filter 1200 includes a first band-pass filter 1210 and a second band-pass filter 1220 in parallel. The first band-pass filter 1210 is formed by series SAW resonators R3 and R5, shunt SAW resonators R1, R2, R4, and R6, and inductor L2. The second band-pass filter 1220 is formed by series SAW resonators R7 and R9, shunt SAW resonators R8 and R10, and inductor L3. Inductors L1 may be present to adjust the input and output impedance of the dual-passband filter. Values of these components are provided in the table within FIG. 12.

Figure 13:
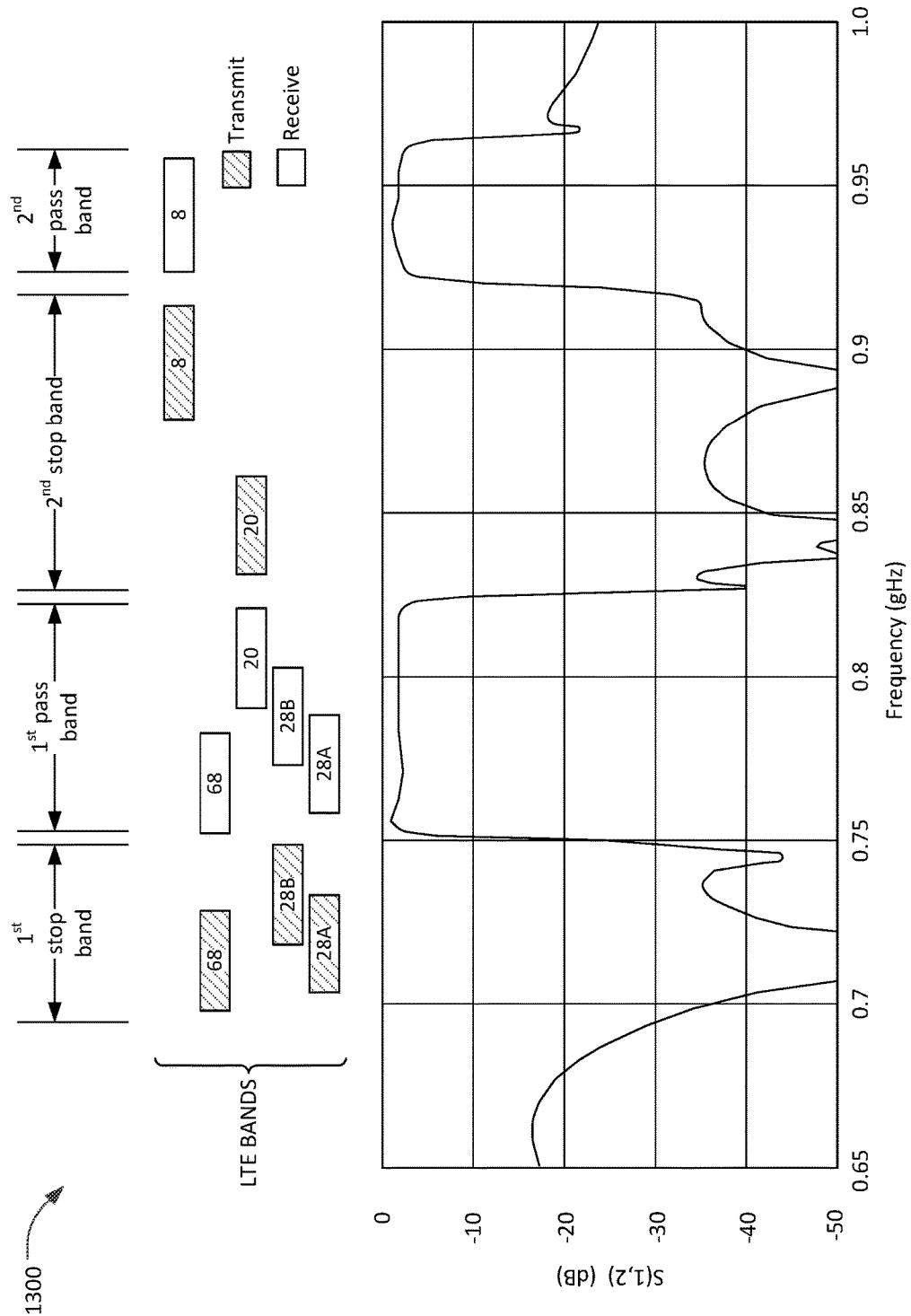
FIG. 13 is a chart showing S(2,1) of the second exemplary SAW dual-passband filter of FIG. 12.

FIG. 13 is a graph of the input-output transfer function S(1,2) versus frequency for the dual-passband filter 1200 of FIG. 12. The dual-passband filter 1200 provides a first passband, a second passband higher in frequency than the first passband, a first stopband lower in frequency than the first passband, and a second stopband between the first and second passbands. The receive frequencies (white bars) and transmit frequencies (shaded bars) of various LTE bands are shown above the graph on the same frequency axis. The dual-passband filter 1200 passes the receive frequencies of LTE bands 8, 20, 28A, 28B, and 68 with no more than a few dB loss, while stopping (providing at least 30 dB attenuation) the transmit frequencies of the same bands.

Example 3

Figure 14:
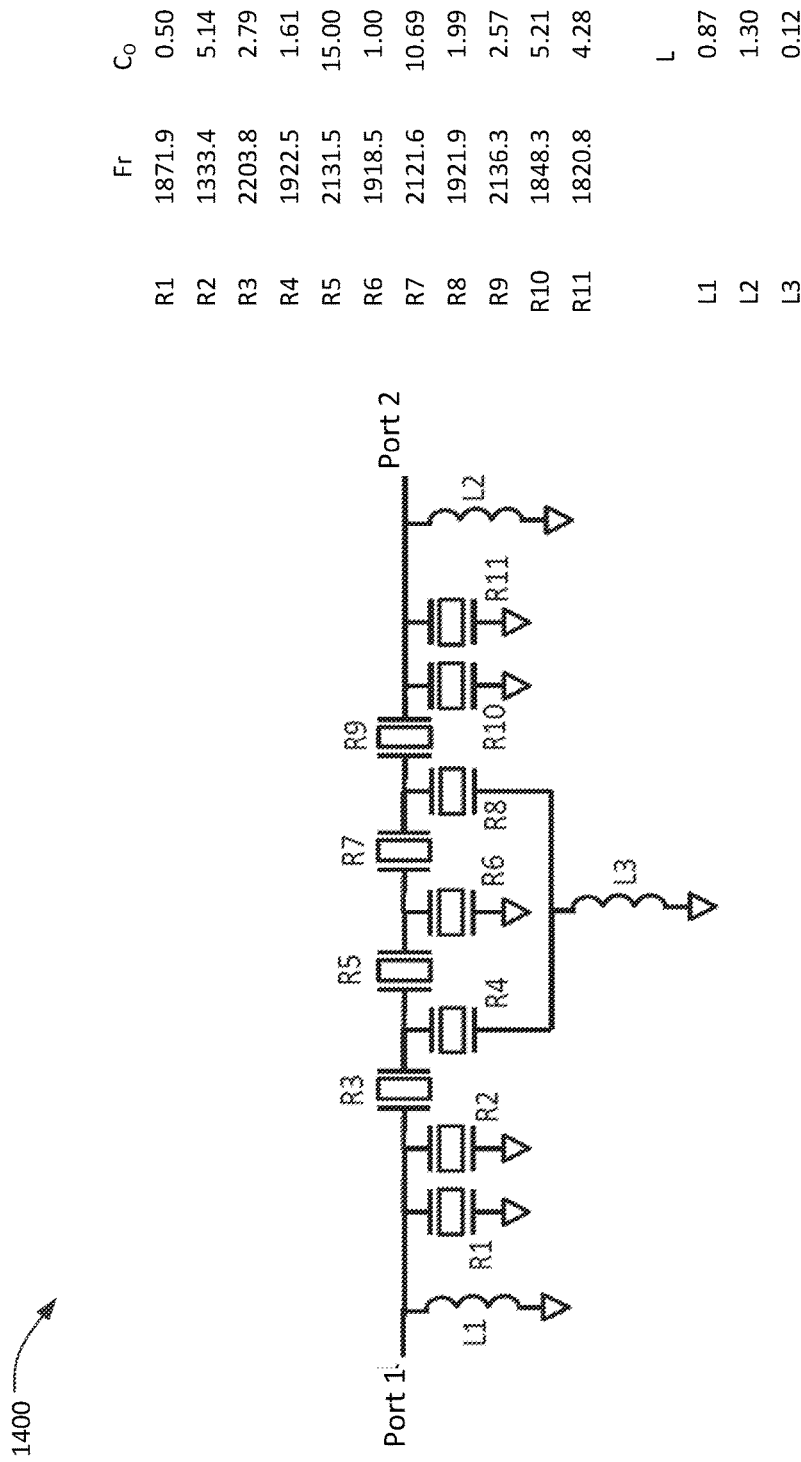
FIG. 14 is a schematic diagram of a third exemplary SAW multi-band filter.

FIG. 14 is a schematic diagram of a SAW filter 1400 suitable for use as the first mid band filter 710. The SAW filter 1400 is wide band-pass filter rather than a dual-passband filter. The filter 1400 is formed by series SAW resonators R3, R5, R7, and R9, shunt SAW resonators R1, R2, R4, R6, R8, R10, and R11, and inductor L3. Inductors L1 and L2 may be present to adjust the input and output impedance of the filter. Values of these components are provided in the table within FIG. 14.

Figure 15:
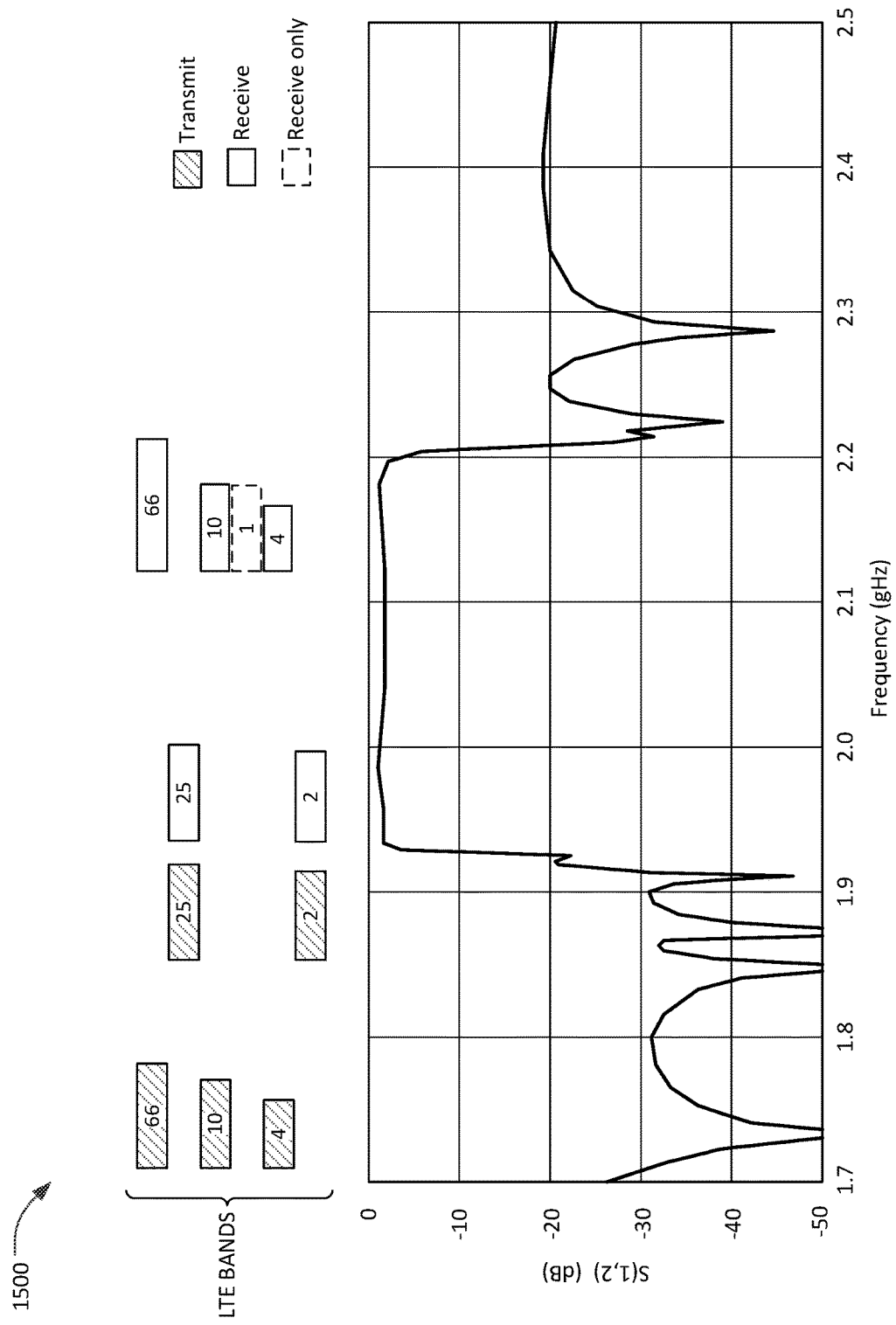
FIG. 15 is a chart showing S(2,1) of the third exemplary SAW multi-band filter of FIG. 14.

FIG. 15 is a graph of the input-output transfer function S(1,2) versus frequency for the filter 1400 of FIG. 14. The receive frequencies (white bars) and transmit frequencies (shaded bars) of various LTE bands are shown above the graph on the same frequency axis. The filter 1400 passes the receive frequencies of LTE bands 1, 2, 4, 10, 25, and 66 with no more than a few dB loss, while stopping (providing at least 30 dB attenuation) the transmit frequencies LTE bands 2, 4, 10, 25, and 66. Note that the transmit frequencies of LTE band 1 are not stopped by the filter 1400, such that band 1 can be used for receive only.

Example 4

Figure 16:
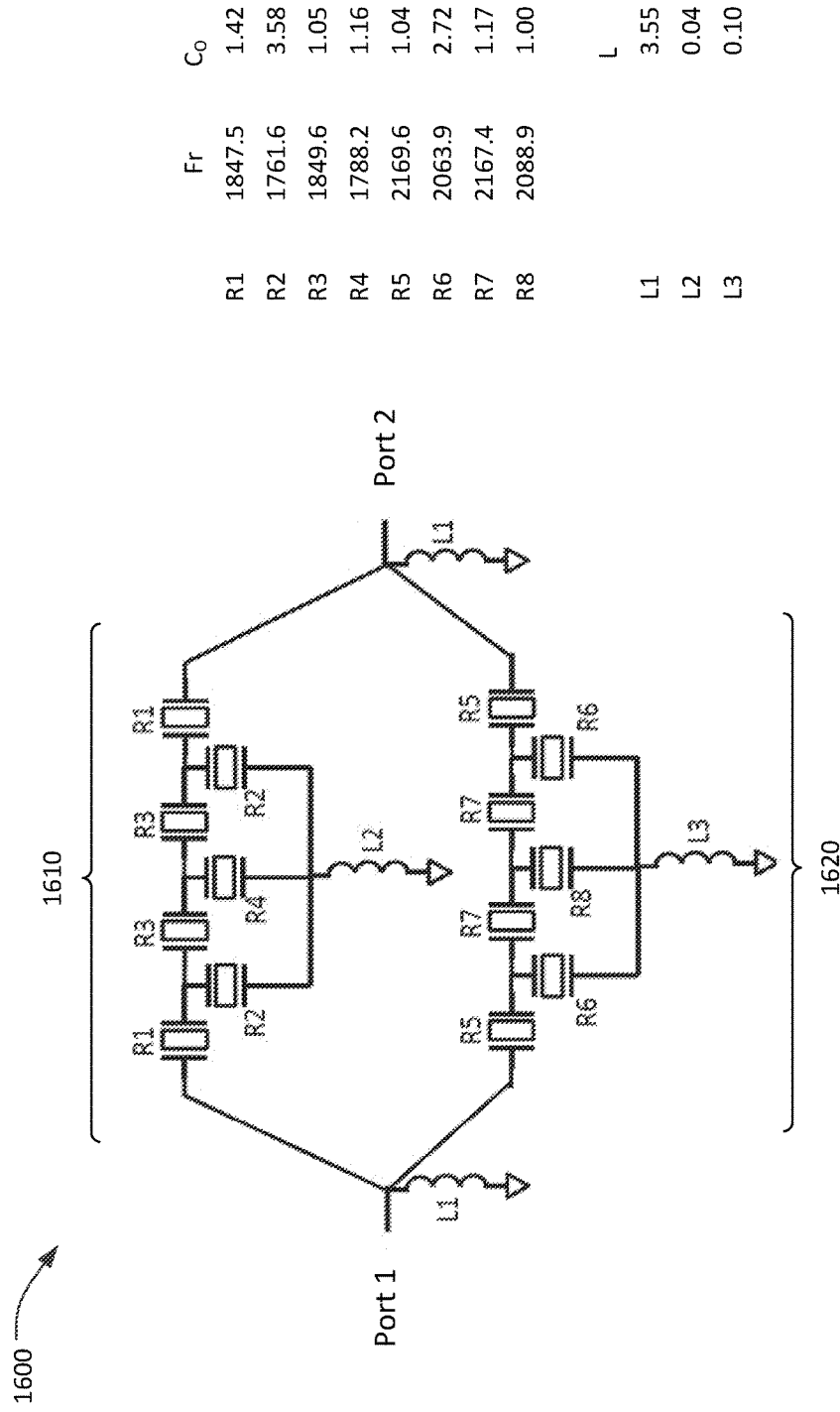
FIG. 16 is a schematic diagram of a fourth exemplary SAW dual-passband filter.

FIG. 16 is a schematic diagram of a dual-passband SAW filter 1600 suitable for use as the second mid band filter 720. The dual-passband filter 1600 includes a first band pass filter 1610 and a second band-pass filter 1620 in parallel. The first band-pass filter 1610 is formed by series SAW resonators R1 and R3, shunt SAW resonators R2 and R4, and inductor L2. The second band-pass filter 1620 is formed by series SAW resonators R5 and R7, shunt SAW resonators R6 and R8, and inductor L3. Inductors L1 may be present to adjust the input and output impedance of the dual-passband filter. Values of these components are provided in the table within FIG. 16.

Figure 17:
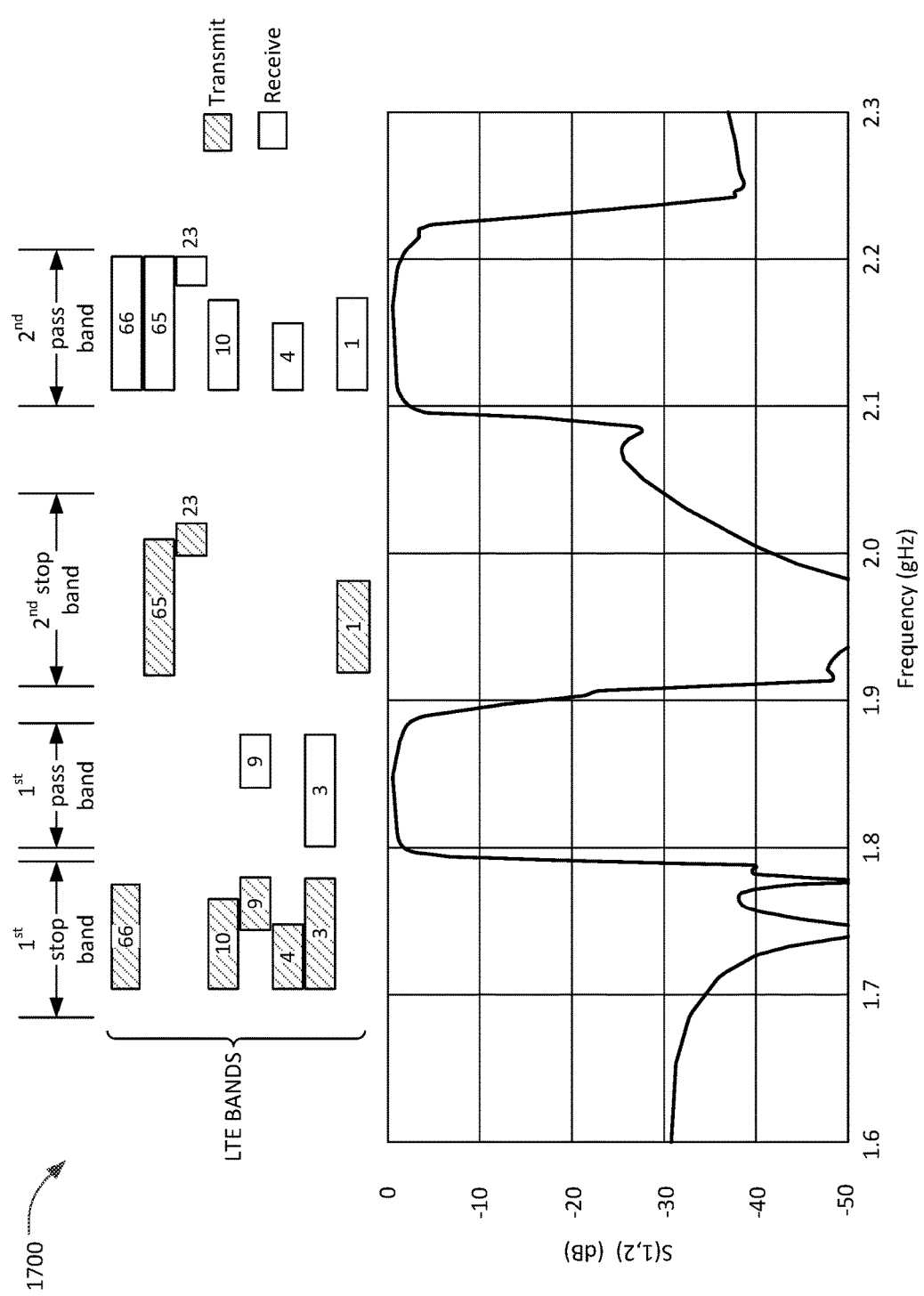
FIG. 17 is a chart showing S(2,1) of the fourth exemplary SAW dual-passband filter of FIG. 16.

FIG. 17 is a graph of the input-output transfer function S(1,2) versus frequency for the dual-passband filter 1600 of FIG. 16. The dual-passband filter 1600 provides a first passband, a second passband higher in frequency than the first passband, a first stopband lower in frequency than the first passband, and a second stopband between the first and second passbands. The receive frequencies (white bars) and transmit frequencies (shaded bars) of various LTE bands are shown above the graph on the same frequency axis. The dual-passband filter 1600 passes the receive frequencies of LTE bands 1, 3, 4, 9, 10, 23, 65, and 66 with no more than a few dB loss, while stopping (providing at least 30 dB attenuation) the transmit frequencies of the same bands.

Example 5

Figure 18:
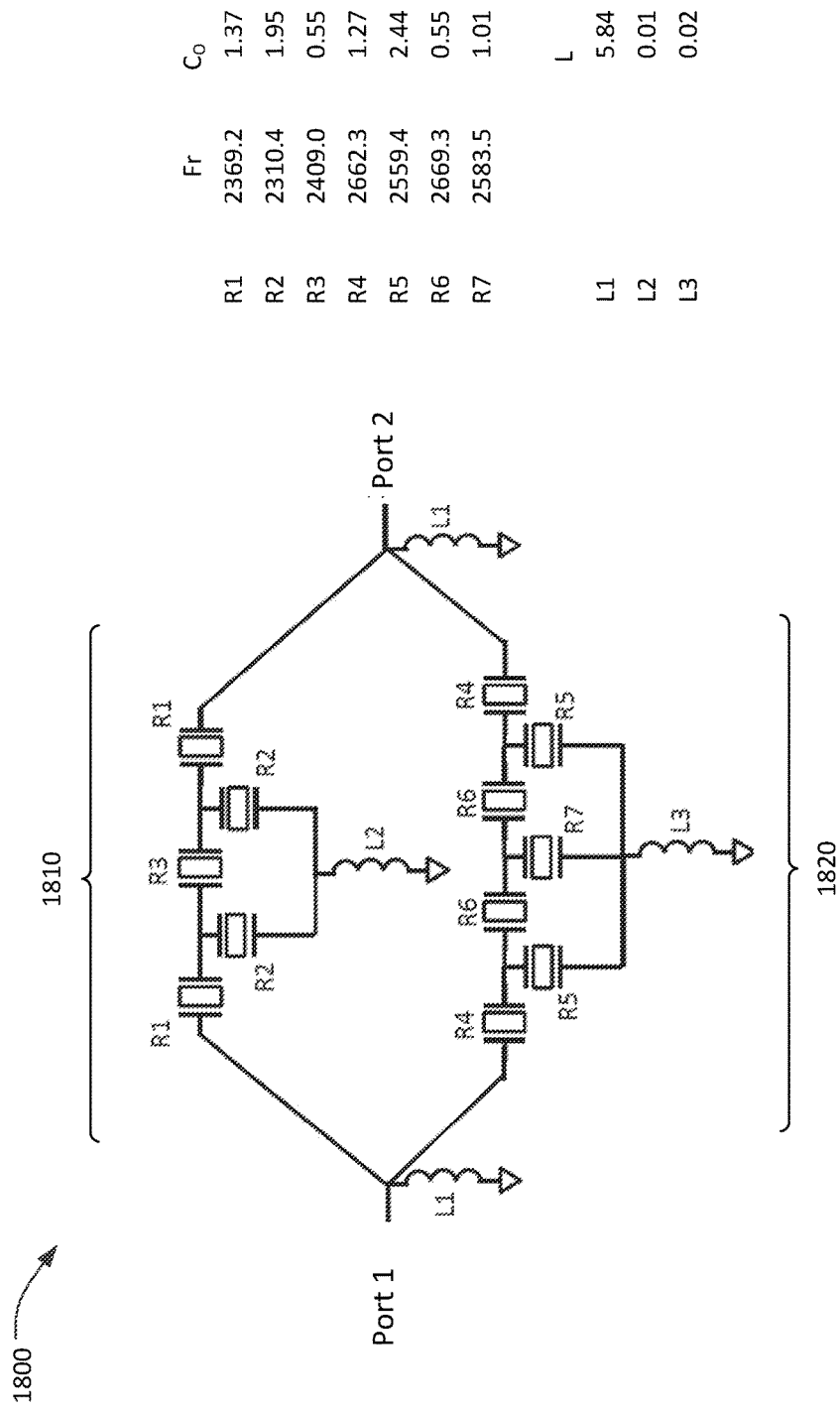
FIG. 18 is a schematic diagram of another exemplary dual-passband SAW filter.

FIG. 18 is a schematic diagram of a dual-passband SAW filter 1800 suitable for use as the high band filter 730. The dual-passband filter 1800 includes a first band pass filter 1810 and a second band-pass filter 1820 in parallel. The first band-pass filter 1810 is formed by series SAW resonators R1 and R3, shunt SAW resonators R2, and inductor L2. The second band-pass filter 1820 is formed by series SAW resonators R4 and R6, shunt SAW resonators R5 and R7, and inductor L3. Inductors L1 may be present to adjust the input and output impedance of the dual-passband filter. Values of these components are provided in the table within FIG. 18.

Figure 19:
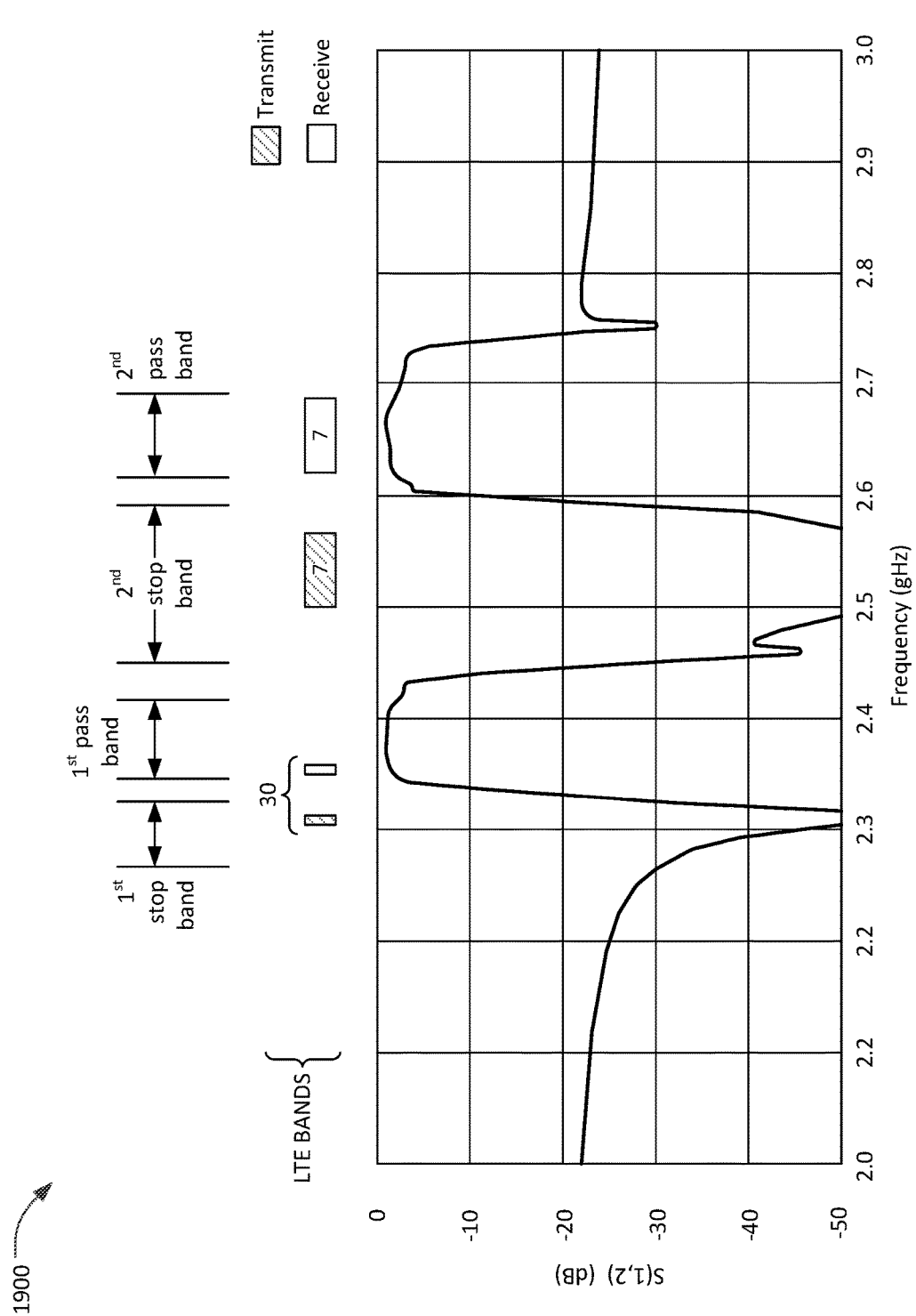
FIG. 19 is a chart showing S(2,1) of the exemplary dual-passband SAW filter of FIG. 18.

FIG. 19 is a graph of the input-output transfer function S(1,2) versus frequency for the dual-passband filter 1800 of FIG. 18. The dual-passband filter 1800 provides a first passband, a second passband higher in frequency than the first passband, a first stopband lower in frequency than the first passband, and a second stopband between the first and second passbands. The receive frequencies (white bars) and transmit frequencies (shaded bars) of various LTE bands are shown above the graph on the same frequency axis. The dual-passband filter 1800 passes the receive frequencies of LTE bands 7 and 30 with no more than a few dB loss, while stopping (providing at least 30 dB attenuation) the transmit frequencies of the same bands.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A communications receiver comprising:
a low noise amplifier;
a multi-band transmit blocking filter having a first port connected to an output of the low noise amplifier; and
an RF analog-to-digital converter having an input connected to a second port of the multi-band transmit blocking filter, wherein
the multi-band transmit filter is configured to
pass the receive frequencies of a group of two or more LTE (long term evolution) bands, where a first receive frequency range of a first band in the group and a second receive frequency range of a second band in the group are disjoint and not subsets of a receive frequency range of a third band in the group, and
attenuate the transmit frequencies of at least some bands in the group by at least twenty dB.

2. The communications receiver of claim 1, wherein the multi-band transmit blocking filter comprises:
a first dual-passband filter having a first passband, a second passband higher in frequency than the first passband, a first stopband lower in frequency than the first passband, and a second stopband between the first and second passbands.

3. The communications receiver of claim 2, wherein
the first dual-passband filter is configured to pass receive frequencies and attenuate, by at least twenty dB, transmit frequencies of LTE bands 5, 6, 12, 13, 14, 17, 18, 19, 26, and 67.

4. The communications receiver of claim 2, wherein
the first dual-passband filter is configured to pass the receive frequencies and attenuate, by at least twenty dB, the transmit frequencies of LTE bands 8, 20, 28A, 28B, and 68.

5. The communications receiver of claim 4, wherein the multi-band transmit blocking filter further comprises:
a second dual-passband filter configured to pass the receive frequencies and attenuate, by at least twenty dB, the transmit frequencies of LTE bands 5, 6, 12, 13, 14, 17, 18, 19, 26, and 67; and
a switch to select one of the first dual-passband filter and the second dual-passband filter.

6. The communications receiver of claim 2, wherein
the first dual-passband filter is configured to pass the receive frequencies and attenuate, by at least twenty dB, the transmit frequencies of LTE bands 1, 3, 4, 9, 10, 23, 65, and 66.

7. The communications receiver of claim 6, wherein the multi-band transmit blocking filter further comprises:
a single-passband filter configured to pass the receive frequencies and attenuate, by at least twenty dB, the transmit frequencies of LTE bands 2, 4, 10, 25, and 66; and
a switch to select one of the first dual-passband filter and the single-passband filter.

8. The communications receiver of claim 7, wherein the multi-band transmit blocking filter further comprises:
a second dual-passband filter configured to pass the receive frequencies and attenuate, by at least twenty dB, the transmit frequencies of LTE bands 7 and 30.

9. The communications receiver of claim 2, wherein
the first dual-passband filter is configured to pass the receive frequencies and attenuate, by at least twenty dB, the transmit frequencies of LTE band 7 and to pass the frequencies of LTE band 40 and the 2.4 GHz ISM (Industrial, Scientific, Medical) band.

10. The communications receiver of claim 9, wherein the multi-band transmit blocking filter further comprises:
a single-passband filter configured to pass the receive frequencies and attenuate, by at least twenty dB, the transmit frequencies of LTE band 30, to pass the frequencies of the 2.4 GHz ISM (Industrial, Scientific, Medical) band and LTE bands 38 and 41; and
a switch to select one of the first dual-passband filter and the single-passband filter.

11. The communications receiver of claim 2, wherein the first dual passband filter comprises:
a first surface acoustic wave (SAW) band-pass filter in parallel with a second SAW band-pass filter, wherein:
the first SAW band-pass filter defines the first passband, and
the second SAW band-pass filter defines the second passband.

12. The communications receiver of claim 11, wherein relative phases transfer functions of the first and second SAW band-pass filters in at least one of the first and second stop bands are controlled such that an insertion loss of the first dual passband filter is greater than insertion losses of both the first and second SAW band-pass filters in isolation for at least one frequency in the at least one of the first and second stop bands.

13. A communications device, comprising:
a low bands receiver configured to receive one or more LTE (long term evolution) bands between 700 MHz and 1 GHz, the low bands receiver comprising:
  a low bands low noise amplifier,
  a low bands transmit blocking filter having a first port connected to an output of the low bands low noise amplifier, and
  a low bands RF analog-to-digital converter having an input connected to a second port of the low bands transmit blocking filter; and
a mid bands receiver configured to receive one or more LTE (long term evolution) bands between 1.7 GHz and 2.2 GHz, the mid bands receiver comprising:
  a mid bands low noise amplifier,
  a mid bands transmit blocking filter having a first port connected to an output of the mid bands low noise amplifier, and
  a mid bands RF analog-to-digital converter having an input connected to a second port of the mid bands transmit blocking filter.

14. The communications device of claim 13, wherein the low bands transmit blocking filter is configured to:
  pass the receive frequencies of a first group of two or more LTE bands, where a first receive frequency range of a first band in the first group and a second receive frequency range of a second band in the first group are disjoint and not subsets of a receive frequency range of a third band in the first group, and attenuate the transmit frequencies of at least some bands in the first group by at least twenty dB.

15. The communications device of claim 14, wherein the low bands transmit blocking filter comprises:
  a first dual-passband filter configured to pass receive frequencies and attenuate, by at least twenty dB, transmit frequencies of LTE bands 5, 6, 12, 13, 14, 17, 18, 19, 26, and 67.

16. The communications device of claim 14, wherein the low bands transmit blocking filter comprises:
  a first dual-passband filter configured to pass the receive frequencies and attenuate, by at least twenty dB, the transmit frequencies of LTE bands 8, 20, 28A, 28B, and 68.

17. The communications device of claim 16, wherein the low bands transmit blocking filter further comprises:
  a second dual-passband filter configured to pass the receive frequencies and attenuate, by at least twenty dB, the transmit frequencies of LTE bands 5, 6, 12, 13, 14, 17, 18, 19, 26, and 67; and
  a switch to select one of the first dual-passband filter and the second dual-passband filter.

18. The communications device of claim 13, wherein the mid bands transmit blocking filter is configured to:
  pass the receive frequencies of a second group of two or more LTE bands, where a first receive frequency range of a first band in the second group and a second receive frequency range of a second band in the second group are disjoint and not subsets of a receive frequency range of a third band in the second group, and
  attenuate the transmit frequencies of at least some bands in the second group by at least twenty dB.

19. The communications device of claim 18, wherein the mid bands transmit blocking filter comprises:
  a third dual-passband filter configured to pass the receive frequencies and attenuate, by at least twenty dB, the transmit frequencies of LTE bands 1, 3, 4, 9, 10, 23, 65, and 66.

20. The communications device of claim 19, wherein the mid bands transmit blocking filter further comprises:
  a first single-passband filter configured to pass the receive frequencies and attenuate, by at least twenty dB, the transmit frequencies of LTE bands 2, 4, 10, 25, and 66; and
  a switch to select one of the third dual-passband filter and the first single-passband filter.

21. The communications device of claim 20, wherein the mid bands transmit blocking filter further comprises:
  a fourth dual-passband filter configured to pass the receive frequencies and attenuate, by at least twenty dB, the transmit frequencies of LTE bands 7 and 30.

22. The communications device of claim 13, further comprising:
  a high bands receiver configured to receive one or more bands between 2.3 GHz and 2.7 GHz, the high bands receiver comprising:
    a high bands low noise amplifier,
    a high bands transmit blocking filter having a first port connected to an output of the high bands low noise amplifier, and
    a high bands RF analog-to-digital converter having an input connected to a second port of the high bands transmit blocking filter.

23. The communications device of claim 22, wherein the high bands transmit blocking filter comprises:
  a fifth dual-passband filter configured to pass the receive frequencies and attenuate, by at least twenty dB, the transmit frequencies of LTE band 7 and to pass the frequencies of LTE band 40 and the 2.4 GHz ISM (Industrial, Scientific, Medical) band.

24. The communications device of claim 23, wherein the high bands transmit blocking filter further comprises:
  a second single-passband filter configured to pass the receive frequencies and attenuate, by at least twenty dB, the transmit frequencies of LTE band 30, to pass the frequencies of the 2.4 GHz ISM band and LTE bands 38 and 41; and
  a switch to select one of the fifth dual-passband filter and the second single-passband filter.

* * * * *